J. GRANDINETTI.
AUTOSLED.
APPLICATION FILED NOV. 7, 1914.
1,151,176.
Patented Aug. 24, 1915.
2 SHEETS—SHEET 1.
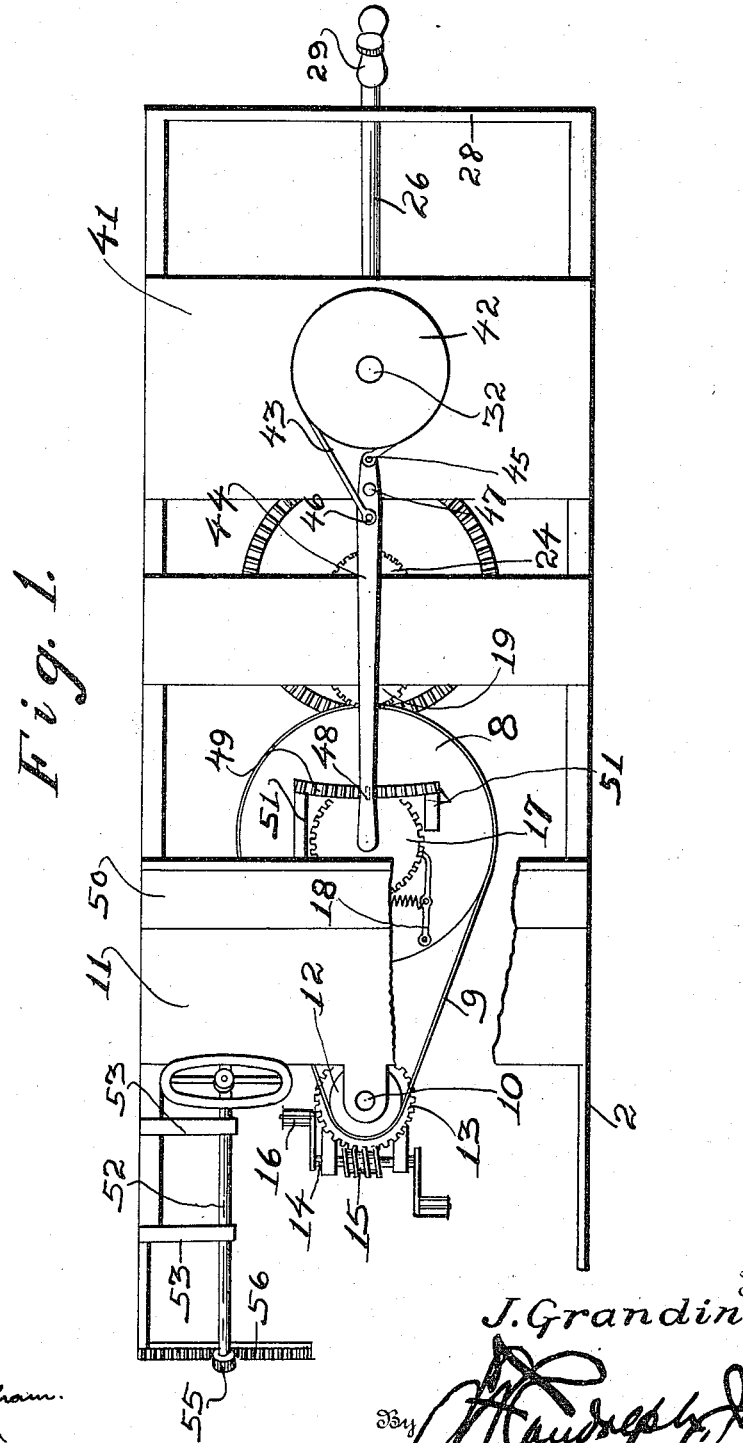
Witnesses
Inventor
J. Grandinetti.
By
Attorney

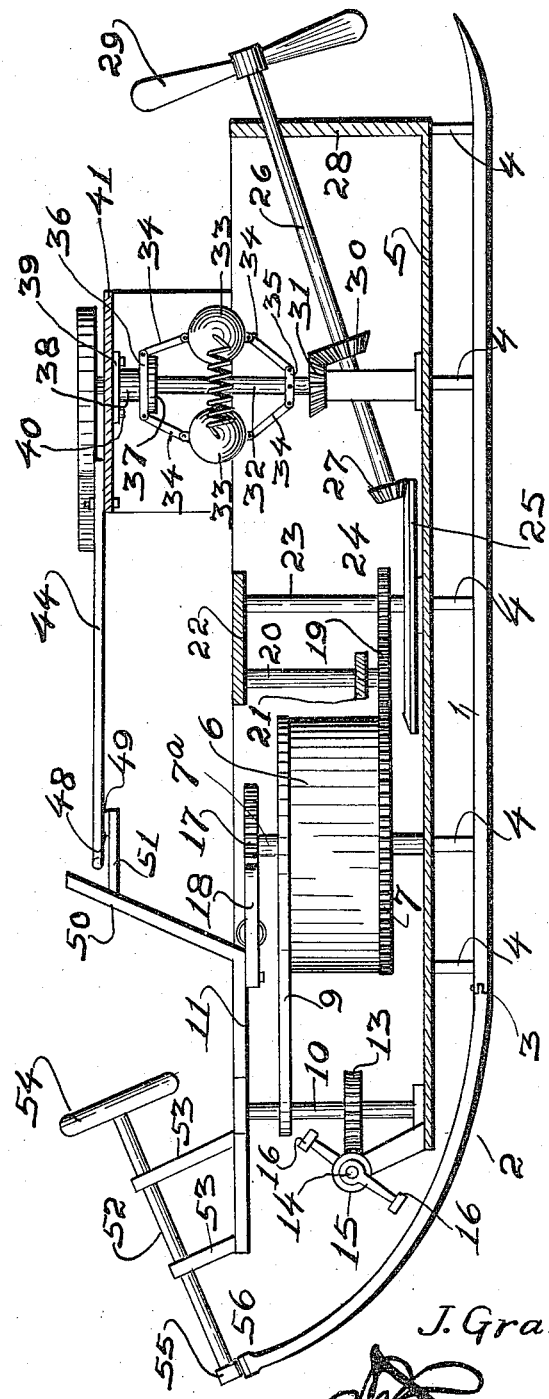

UNITED STATES PATENT OFFICE.

JOSEPH GRANDINETTI, OF PATCHOGUE, NEW YORK.

AUTOSLED.

1,151,176. Specification of Letters Patent. Patented Aug. 24, 1915.

Application filed November 7, 1914. Serial No. 870,877.

*To all whom it may concern:*

Be it known that I, JOSEPH GRANDINETTI, a citizen of the United States, residing at Patchogue, in the county of Suffolk and State of New York, have invented certain new and useful Improvements in Autosleds; and I do hereby declare the following to be a full, clear, and exact description of the invention, such as will enable others skilled in the art to which it appertains to make and use the same.

This invention relates to auto sleds, and one of the principal objects of the invention is to provide simple, reliable and efficient means for rotating a wind propeller at the back of the sled and to provide simple means for directing the sled in its movements.

Another object of the invention is to provide a sled in which a spring motor is used, said motor being adapted to be wound by foot pedals under the driver's seat, and means being provided for rotating a wind propeller wheel, from said spring motor, and to also provide means for governing or regulating the speed of the propeller shaft and means to guide the sled in its movement.

The foregoing and other objects may be attained by means of the construction illustrated in the accompanying drawings, in which—

Figure 1 is a top plan view of an auto sled made in accordance with this invention, and Fig. 2 is a longitudinal sectional view of the same.

Referring to the drawing, the numeral 1 designates the runners, and 2 the front portions of the runners pivoted at 3 to the front ends of the runners 1. Supported on the runners 1 is a framework comprising uprights 4 and a suitable platform 5. Supported upon the platform 5 is a casing 6 containing a spring, one end of which is secured to a gear wheel 7 at the outer end and having at its inner end a pulley 8 around which a belt 9 passes, said belt being passed around a vertical shaft 10 mounted in the platform and in a seat frame 11. The shaft 10 carries a small pulley 12 around which the belt 9 passes, and a worm gear 13 is mounted on said shaft and operated by means of a pedal shaft 14 carrying a worm 15 and a suitable foot pedals 16.

The spring in the casing 6 is wound by means of the pedals and the worm gearing, and on the upper end of the shaft 7ª is a ratchet wheel 17 engaged by a pawl 18 to hold the spring in wound condition. The gear wheel 7 is in mesh with a smaller gear 19 on a shaft 20 supported in suitable brackets 21 and 22. A shaft 23 is provided with a gear wheel 24 in mesh with the gear wheel 19, and upon the lower end of the shaft 23 is a large bevel gear 25. A propeller shaft 26 is provided with a pinion 27 in mesh with the bevel gear 25, and said shaft 26 is supported in an inclined position in an upright 28 and is provided at its end with a propeller wind wheel 29. The propeller shaft 26 is provided with a bevel gear 30 which meshes with a similar gear 31 mounted upon a shaft 32. A governor is mounted on the shaft 32 and comprises the weight 33, the pivoted arms 34, and the collars 35 and 36. A disk 37 is connected to a sleeve 38 held rigidly by means of an annular flange 39 secured by bolts 40 to a platform or support 41. On the upper end of the shaft 32 is a frictional brake-wheel 42 around which a strap 43 passes, said strap being connected at one end to a lever 44 at 45 while the other end is connected to said lever at 46 and said lever is pivoted at 47. At the opposite end the lever is provided with a pawl 48 which engages a sector rack 49.

The driver's seat 5 is provided with a bracket 51 for supporting the brake-lever and the sector rack. A steering post 52 is mounted in brackets 53, and said steering post is provided with a hand wheel 54 within easy reach of the driver, and upon the end of said post is a pinion 55 which engages a rack bar 56 mounted at the upper end of the front portions 2 of the runners.

From the foregoing it will be obvious that an auto sled made in accordance with this invention will attain considerable speed, and that the speed can be regulated by the governor and by means of the brake-lever 40, and that the spring can be readily wound up by means of the foot pedals 16 and the device can be properly steered by means of the hand wheel 54.

Various changes may be made in the details of construction without departing from the spirit and scope of the invention as defined in the claims.

What is claimed is:—

1. In an auto sled, a supporting structure, a spring motor carried by said supporting structure, a propeller shaft operatively connected to said motor, an aerial propeller secured to said shaft, a vertical shaft, means operatively connecting said vertical shaft and propeller shaft, a governor on said vertial shaft whereby the rotation of said propeller shaft is governed.

2. In an auto sled, a supporting structure, a spring motor carried by said supporting structure, a propeller shaft operatively connected to said motor, an aerial propeller secured to said shaft, a vertical shaft, means operatively connecting said vertical shaft and propeller shaft, a governor on said vertical shaft whereby the rotation of said propeller shaft is governed, a brake drum secured on the upper end of said vertical shaft, a brake band mounted about said drum, a lever connected to said brake band for moving the same into or out of frictional engagement with the periphery of said drum for arresting or permitting rotation of said vertical shaft and propeller shaft.

In testimony whereof I affix my signature in presence of two witnesses.

JOSEPH GRANDINETTI.

Witnesses:
JOHN R. VUNK,
JACOB STARK.

Copies of this patent may be obtained for five cents each, by addressing the "Commissioner of Patents, Washington, D. C."